United States Patent [19]
Berke

[11] Patent Number: 5,964,236
[45] Date of Patent: Oct. 12, 1999

[54] METHOD AND APPARATUS FOR COVERING CARGO

[76] Inventor: Lanny R. Berke, 4470 Forestview La. North, Plymouth, Minn. 55442

[21] Appl. No.: 08/959,550

[22] Filed: Oct. 28, 1997

[51] Int. Cl.$^6$ ................................................ E04H 15/00
[52] U.S. Cl. .............................. 135/87; 135/90; 135/115; 296/98
[58] Field of Search ................................. 135/87, 88.01, 135/90, 121, 115, 191, 156, 161; 296/98, 100

[56] References Cited

U.S. PATENT DOCUMENTS

| | | |
|---|---|---|
| 2,977,900 | 4/1961 | Farrar . |
| 3,397,009 | 8/1968 | Landenberger . |
| 5,007,672 | 4/1991 | Koch . |
| 5,152,575 | 10/1992 | DeMonte et al. . |
| 5,338,084 | 8/1994 | Wardell . |
| 5,415,194 | 5/1995 | Kaye ........................................ 135/115 |
| 5,513,670 | 5/1996 | Childress ................................ 135/154 |
| 5,579,610 | 12/1996 | Jackson .................................. 135/141 |
| 5,692,534 | 12/1997 | Brumfield ................................. 135/90 |
| 5,732,726 | 3/1998 | Lee ......................................... 135/156 |

*Primary Examiner*—Beth Aubrey
*Attorney, Agent, or Firm*—James D. Christoff

[57] ABSTRACT

Cargo is covered by use of a tarp and a frame that extends over the tarp. A number of cords are connected to the tarp and a plurality of couplers interconnect the cords to the frame. The couplers releasably connect the tarp to the frame so that the tarp can be dropped onto the cargo once the frame is moved into a position over the cargo by, for example, a forklift. Preferably, the cords include free terminal end sections that can be pulled from ground level to disconnect the cords from the frame when desired, so that walking across the cargo can be avoided.

20 Claims, 6 Drawing Sheets

METHOD AND APPARATUS FOR COVERING CARGO

BACKGROUND OF THE INVENTION

1. Field of the Invention

This invention broadly relates to a method and apparatus for covering cargo such as cargo carried by a truck, trailer, railway car or other vehicle. More specifically, this invention concerns a method and apparatus for covering cargo with a tarp by use of a frame that is releasably connected to the tarp.

2. Description of the Related Art

Trucks, trailers and railway cars have long served the important function of moving consumer, commercial and industrial goods and equipment from one location to another. Cargo that is moved over relatively short distances or that is not likely to be degraded by the effects of weather is sometimes left uncovered. However, cargo that is moved over longer distances and/or left outdoors for significant lengths of time is frequently covered or otherwise protected to guard against the possibility of rain, snow, dust, dirt and the like from adversely affecting the cargo.

Many trucks, trailers, railway cars and other vehicles for carrying cargo have a permanently enclosed structure that includes rigid sidewalls and a roof that cover the vehicle's floor or bed. For example, railway boxcars commonly have steel walls and a roof, and are often used to carry pallet-sized units of cargo or palletized assemblies of smaller cargo that can be loaded by a forklift through doors provided in one or more of the walls. Many semi-trailers and larger trucks also have a permanently enclosed structure, with a door or a pair of doors at the rear end of the bed to provide access to the interior space.

Trucks, trailers and railway cars with flat beds are also widely used to haul a variety of loads. Flat bed vehicles are particularly advantageous for carrying larger cargo since there are typically no permanent walls or other structure extending upwardly from the bed that might otherwise impede access to the bed and hinder loading or unloading the cargo. For example, relatively large construction materials such as long steel or concrete beams, culverts and pipes can be readily loaded onto a flat bed vehicle by using a forklift and approaching the vehicle from its side. Such materials are often difficult if not impossible to load onto vehicles having permanently enclosed structures because the length of the materials frequently exceeds the width of the doors.

However, in order to protect cargo on flat bed vehicles from dust, dirt, snow, rain and other elements, it is often desirable to cover the cargo with a tarp once the cargo has been placed on the bed. Such tarps are commonly made of a canvas fabric since the strength of the canvas fabric can safely withstand the effects of wind during high speed movement of the vehicle. In some instances, a plastic underlayment tarp is placed beneath the canvas tarp to provide an additional barrier to guard against moisture from reaching the cargo.

One conventional method of covering flat bed cargo with a tarp involves placing a folded tarp atop a portion of the cargo and then unfolding the tarp while walking across the top of the cargo. Once unfolded, a cord such as a rope, or a series of cords such as rope segments or elastic straps, is used to tie a peripheral edge portion of the tarp to the bed at a number of locations spaced along the perimeter of the bed. For example, the tarp may have a plurality of grommets along its edges and rope segments or elastic straps may be secured to each grommet and a respective eyelet or other anchoring structure located along the periphery of the bed in order to bind the tarp to the vehicle.

However, canvas tarps are often heavy and difficult to maneuver to a position properly aligned with the cargo and the bed. Moreover, the practice of walking along the top of the load can present significant hazards and lead to serious injury. For example, cargo that includes large round pipes or other curved surfaces may not have adequate horizontal surfaces to provide safe footing. As another example, the cargo may be slippery due to rain or snow. If a plastic underlayment tarp is used, the plastic material can significantly increase the risk of serious injury, especially if the plastic material is smooth or slippery.

Occasionally, a forklift is used to lift the folded tarp to the top of the load in order to ease the task of moving the heavy tarp. Unfortunately, such a procedure does not ease the burden or lessen the risks associated with the remaining tasks of unfolding the tarp and aligning the tarp to the bed and the cargo. Unfolding and maneuvering the tarp while walking across the top of the cargo is often practiced because the height of the cargo precludes unfolding the tarp from the ground. Moreover, there is often insufficient space between the edge of the bed and the cargo to safely walk while unfolding the tarp.

Efforts have been undertaken in the past to facilitate covering loads on flat bed vehicles. For example, U.S. Pat. No. 5,007,672 describes a cover system that includes a plurality of inverted, U-shaped bows that fit into side posts which, in turn, are received in brackets next to the bed; tarp sections including side sections and a top section are placed over the posts and to the bows. However, the bows and posts represent an additional expense as well as additional weight, and the problem of unfolding the tarp across the top of the bows is presented.

U.S. Pat. Nos. 5,338,084 and 5,152,575 describe cover systems for flat bed vehicles wherein a series of inverted bows secured to the vehicle are movable in a path along the length of the bed, and wherein a tarp connected to the bows unfolds in accordion-like fashion as the bows are moved to respective locations along the bed. However, the bows as well as structure provided to guide movement of the bows represents a significant additional expense as well as additional weight that may adversely affect fuel economy. An additional expense may be encountered in customizing the tarp to fit and connect with the bows. Furthermore, the bows may interfere with access to cargo even after the bows are moved forwardly to uncover the load, especially if the cargo is located near the front of the bed.

SUMMARY OF THE INVENTION

My present invention is directed to a method and apparatus for covering cargo with a tarp by use of a frame that supports the tarp while the tarp is lifted and moved to a position properly aligned with the cargo. A number of couplers interconnect the frame and the tarp and can be released when desired in order to disconnect the frame from the tarp and enable the tarp to rest atop the cargo. The tarp is then secured to the bed of the vehicle in order to protect the cargo until the cargo has reached its destination.

In more detail, the invention concerns in one aspect an apparatus for covering cargo that comprises a tarp having a peripheral edge portion, and a plurality of cords connected to the tarp at spaced-apart locations along the peripheral edge portion. A frame extends over the tarp, and a number of couplers interconnect the frame and at least some of the cords. The couplers releasably couple the frame to the tarp.

In another aspect, the invention concerns a method of covering cargo that comprises the steps of placing a frame over a tarp, and releasably connecting a number of cords coupled to spaced-apart locations on the tarp to the frame. The method also includes the steps of relatively moving the frame and the cargo such that the frame and the tarp are located over the cargo, and pulling on the cords while the tarp and the frame are in position over the cargo such that the tarp is disconnected from the frame.

The present invention is highly advantageous, in that the tarp may be lifted to the top of the cargo and placed in a position properly aligned with the cargo and the vehicle without walking across the top of the cargo or along sides of the bed. Moreover, the tarp may be unfolded on the ground before it is lifted over the cargo and need not be unfolded while standing on the cargo or on the bed. Preferably, the couplers interconnecting the tarp and the frame can be released by the operator from ground level while the tarp is suspended over the cargo so that the hazardous practices of walking or standing on the bed or the cargo is completely avoided. Additionally, a conventional forklift (such as the same forklift used to load the cargo onto the vehicle) may be used to lift the frame and the tarp, so that expensive customized hoists or other equipment are not needed.

A number of other features and advantages of the invention are described in the paragraphs that follow.

DETAILED DESCRIPTION OF THE PREFERRED EMBODIMENTS

An apparatus for covering cargo in accordance with one embodiment of the invention is shown in FIGS. 1–9 and is designated broadly by the numeral 10 in FIGS. 4–8. The apparatus 10 includes a frame 12 that is shown alone in FIG. 1. Preferably, the frame 12 is rigid and has an overall, generally rectangular shape that extends in a horizontal reference plane.

The frame 12 in the illustrated embodiment has four side members 14 that extend around its rectangular periphery and a pair of cross-braces 16 that extend from opposite corners of the rectangular periphery to enhance rigidity of the frame 12. Many other configurations of the frame 12 are also possible. Preferably, the side members 14 and the cross-braces 16 are made of lengths of rigid, relative lightweight material that is resistant to corrosion such as round or square aluminum tubing, although sections of solid aluminum stock or hollow or solid sections of other types of material (including steel tubing or galvanized steel tubing) may also be used.

Figure 1:
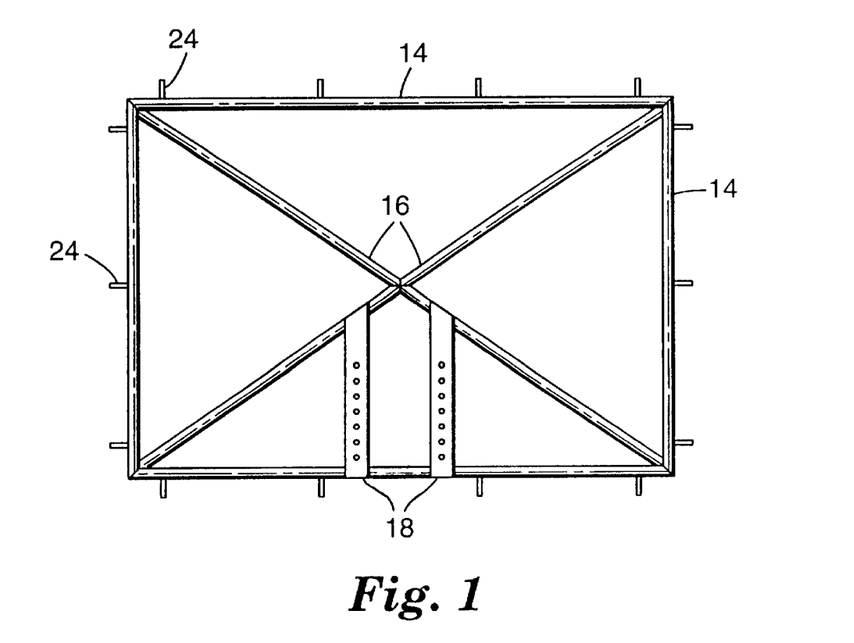
FIG. 1 is a plan view of a frame of an apparatus for covering cargo according to one embodiment of the invention.

In the embodiment shown in FIG. 1, ends of the side members 14 are permanently fixed to adjacent ends of other side members 14 and to the cross-braces 16 by welds. As an alternative, however, the connections between adjacent side members 14 and cross-braces 16 are made using fasteners such as nuts and bolts and optionally include plates or brackets to increase the strength of the connection. Optionally, the fasteners may be disassembled to partially or completely take apart the frame 12 when desired. For example, the frame 12 may be taken apart to store beneath the cargo bed when the vehicle is in transit.

The frame also includes a pair of spaced apart receptacles 18 (see, e.g., FIG. 2) for receiving tines of a forklift. In the illustrated embodiment, each receptacle 18 is made using a length of tubular stock having a hollow interior space with a free cross-sectional area that matingly receives the forklift tines. The stock is preferably lightweight and corrosion resistant, and may be made of the same material used to construct the side members 14 and the cross-braces 16. Each length of stock is preferably fixed to the top of one side member 14 and extends to the top of an adjacent cross-brace 16.

Figure 2:
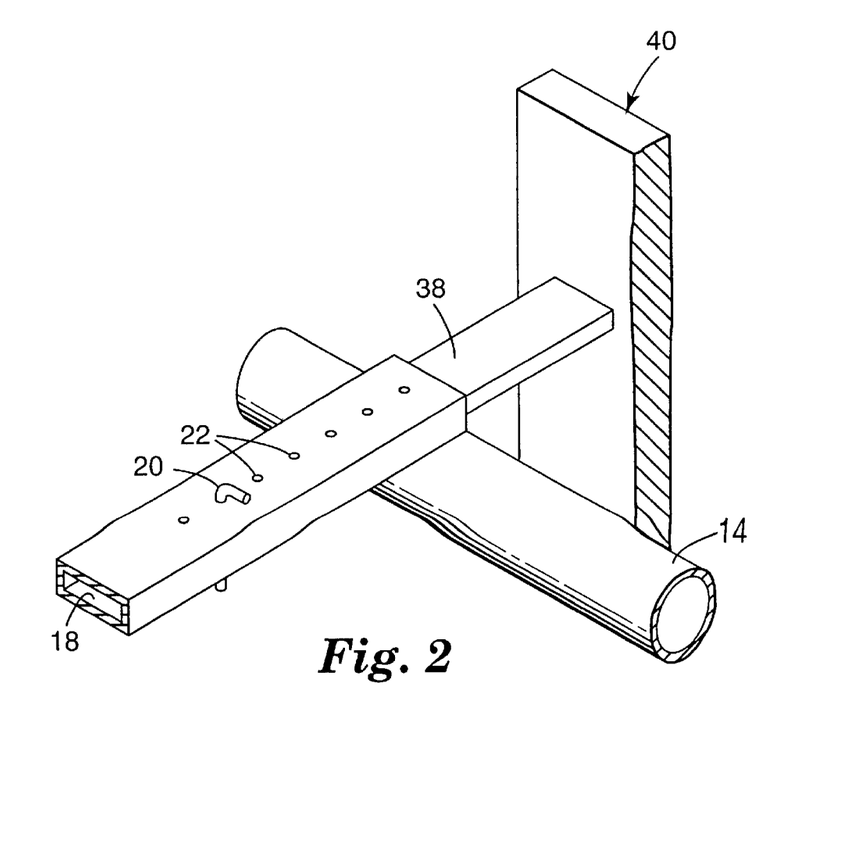
FIG. 2 is an enlarged, fragmentary, perspective view of a portion of the frame shown in FIG. 1, also illustrating a forklift tine that has been inserted into a receptacle of the frame.

Each receptacle 18 preferably includes a stop 20 as illustrated in FIG. 2 for limiting the depth of insertion of a forklift tine. The stop 20 comprises an L-shaped rod that is received in a pair of aligned holes formed in upper and lower wall portions of the receptacle stock. Preferably, a series of holes 22 are made along the length of the stock to provide adjustment of the depth of tine insertion. Although not shown in the drawings, the stop 20 may optionally include a lower aperture to receive a pin (such as a cotter pin) to releasably retain the stop 20 in the selected pair of holes 22.

Other frame constructions are also possible. For example, the frame 12 may be made in sections that can be disassembled or are hinged to one another to facilitate storage and transit of the frame when not in use. Additionally, the frame may include bracing that also serves as receptacles for the forklift tines as an alternative to the receptacles depicted in the drawings.

A number of fingers 24 are connected to the frame 12. Preferably, and as shown for example in FIGS. 1 and 5, each finger 24 is made of a rigid, elongated section of lightweight material such as round or square aluminum tubing resembling a reduced size variation of the material of the side members 14 and the cross-braces 16, although sections of solid aluminum stock or hollow or solid sections of other types of material may also be employed. Preferably, each finger 24 extends outwardly from the frame 12 in a generally horizontal direction parallel to the aforementioned reference plane containing the frame 12. The fingers 24 are rigidly connected (for example by welding) to adjacent side members 14 at spaced apart, preferably regular intervals along the entire rectangular periphery of the frame 12.

Figure 3:
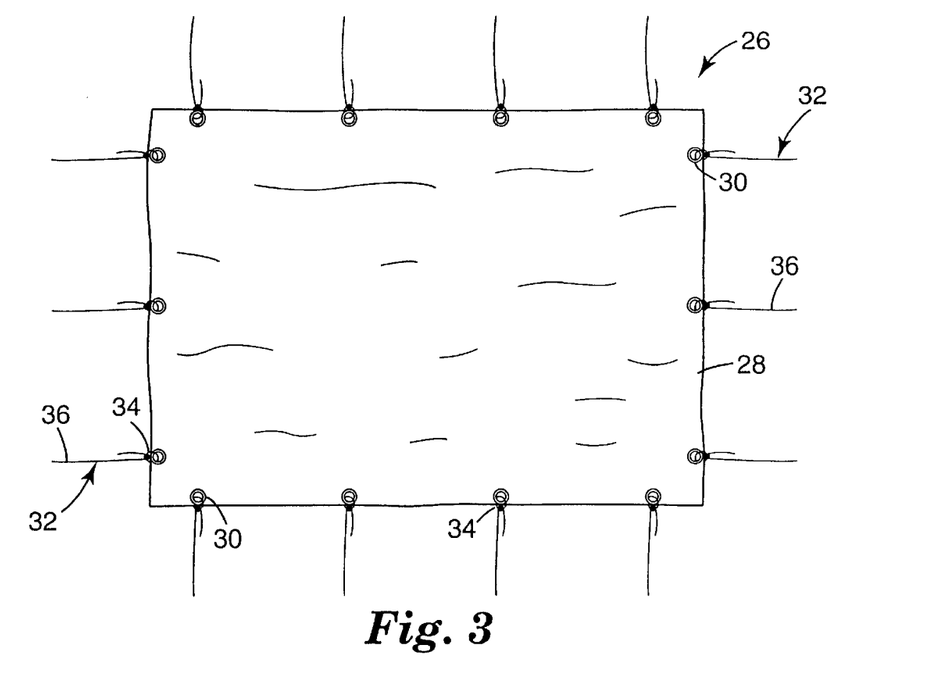
FIG. 3 is a plan view of a tarp and a number of cords of the apparatus.

The apparatus 10 also includes a tarp 26 that is shown alone in FIG. 3. The tarp 26 has an outer edge portion 28 that extends along its entire periphery. The tarp 26 as depicted in FIG. 3 has a rectangular configuration, although other shapes are also possible. A series of grommets 30 are connected to the edge portion 28 and provide a series of spaced apart, reinforced holes along the periphery of the tarp 26. The tarp 26 is made of a sturdy sheet-like material that can safely withstand the effects of wind during transit, such as canvas or other fabric, or such as heavy plastic.

The apparatus 10 further includes a plurality of cords 32 that are connected to the tarp 26 at spaced-apart locations along the peripheral edge portion 28. Each cord 32 has a first end section that extends through a respective grommet 30 and is tied to itself in such a manner as to present a loop portion 34. Each cord 32 also has a free, terminal second end section 36 of significant length (such as, for example, at least two or three feet depending on the expected height of the cargo to be covered).

The cords 32 are preferably flexible and made of weather-resistant material. Examples of suitable cords include ropes having fibers or filaments made of natural fibers such as manila, sisal and the like, synthetic fibers such as nylon, polyester or polypropylene, metallic fibers such as steel or stainless steel, or blends of any of the foregoing. The cords 32 may also be made of wire, chain or strapping. The cords 32 may be elastic or non-elastic, and optionally are provided with hooks coupled to the free end sections 36 to facilitate connection to a vehicle.

Moreover, the loop portion 34 may be made of the same material as the remaining sections of the cord 32 as shown in the drawings or may instead be made of a rigid ring comprised, for example, of galvanized steel. If a rigid ring is employed, the free end section 36 may comprise a length of flexible cord that is connected to one side of the ring. The opposite side of the rigid ring may extend through the grommet 30 or alternatively may be connected to a second length of flexible cord that extends through the grommet 30.

Figure 4:
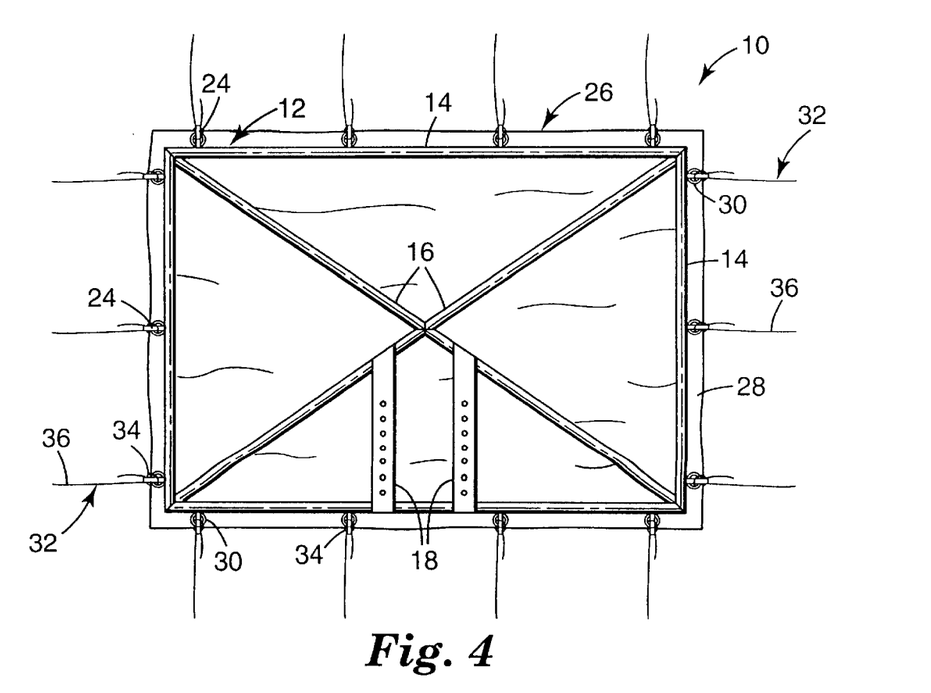
FIG. 4 is a plan view of the frame of FIGS. 1 and 2 as placed in a position extending across the tarp shown in FIG. 3.
Figure 5:
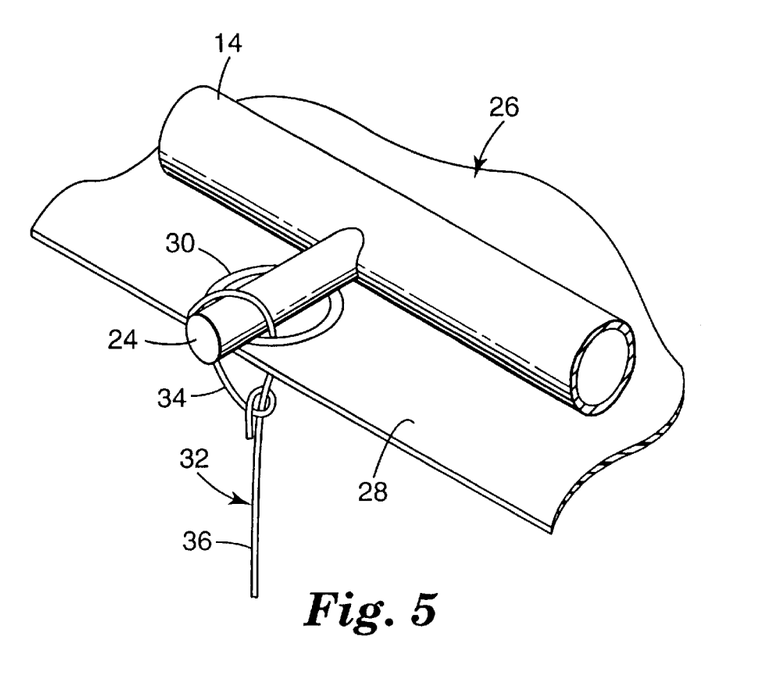
FIG. 5 is an enlarged, fragmentary, perspective view of a portion of the apparatus shown in FIG. 4, illustrating in detail one of the cords connected to a grommet of the tarp, and also showing a finger connected to the frame and extending through a loop portion of the cord to serve as a coupler that releasably couples the tarp to the frame.

In FIG. 4, the tarp 26 is shown connected to the frame 12. FIG. 5 illustrates the connection between the tarp 26 and the frame 12 in more detail. As illustrated, the loop portion 34 of each cord 32 is slipped over a respective finger 24 to releasably connect the tarp 26 to the frame 12. The spacing between adjacent fingers 24 is approximately the same as the spacing between adjacent grommets 30. Preferably, the spacing between adjacent fingers 24 is uniform along opposite side members 14 as illustrated in FIG. 4 so that the frame 12 may be positioned relative to the tarp 26 in either of two opposite orientations about a vertical reference axis when the frame 12 extends in horizontal plane.

In practice, the tarp 26 may be conveniently unfolded on the ground and moved by the driver or other person as needed until assuming a relatively flat orientation. Next, tines 38 (see, e.g., FIG. 2) of a forklift 40 are moved into respective receptacles 18 of the frame 12. The forklift operator then raises the tines 38 to lift the frame 12 and moves the forklift 40 to a position wherein the frame 12 is approximately centered over the tarp 26, such as the position of the frame 12 relative to the tarp 26 as shown in FIG. 4.

Next, the vehicle driver, forklift operator or other person slides the loop portion 34 of each cord 32 over a respective, overlying finger 24 until the loop portion is next to the adjacent side member 14. Preferably, the frame 12 is suspended a few inches above the tarp 26 during connection of the loop portions 34 to the fingers 24 so that the tarp 26 can be moved or stretched as needed. Connection of the loop portions 34 to the fingers 24 can be conveniently carried out by walking on ground level along the peripheral edge portion 28 of the tarp 26.

The forklift operator then raises the tines 38 to lift the frame 12. As the frame 12 is lifted, the tarp 26 is raised from the ground and is suspended by the cords 32. Preferably, the overall horizontal width and depth of the frame 12 is only a few inches (such as, for example, approximately six inches) less than the overall width and depth of the tarp 26 so that the tarp 26 does not unduly sag as it is lifted from the ground and hinder subsequent disconnection from the frame 12.

Figure 6:
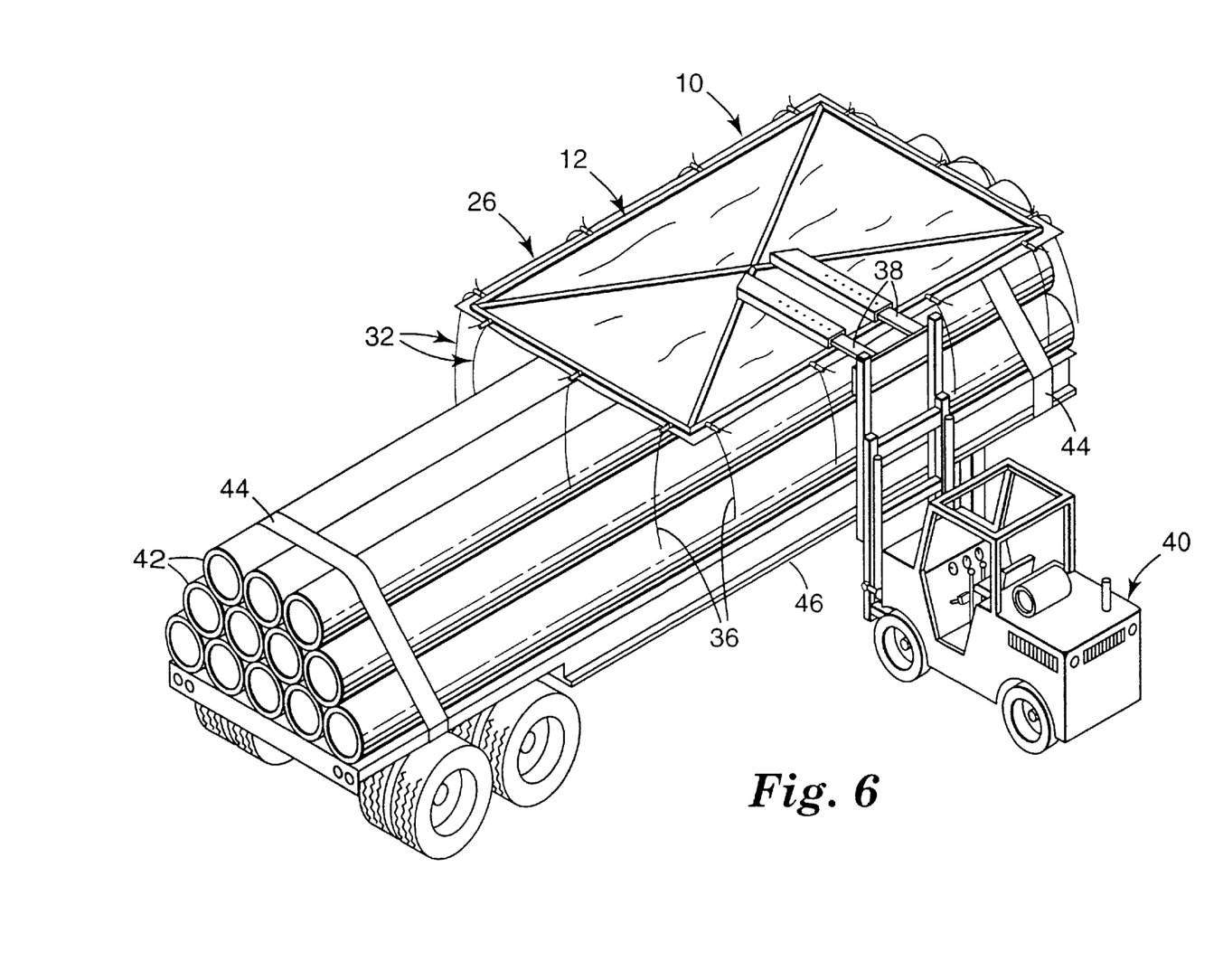
FIG. 6 is a reduced perspective view of the apparatus depicted in FIG. 4 along with a forklift and a flat bed trailer, wherein the forklift is shown suspending the apparatus over a load of cargo that has been secured to a bed of the trailer.
Figure 7:
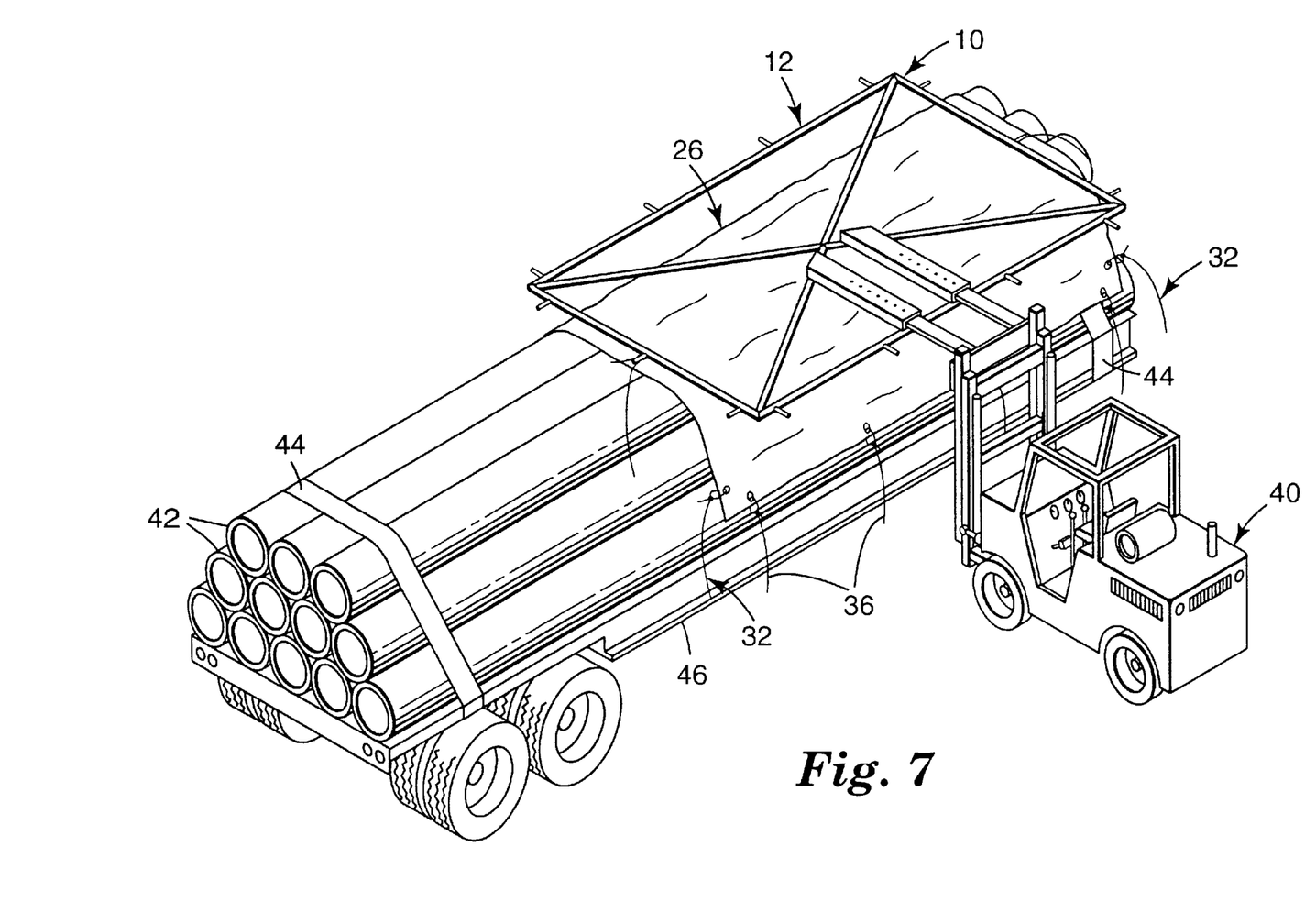
FIG. 7 is a view somewhat similar to FIG. 6 except that the loop portion of each cord has been released from a corresponding finger in order to disconnect the tarp from the frame and drape the tarp over the cargo.
Figure 8:
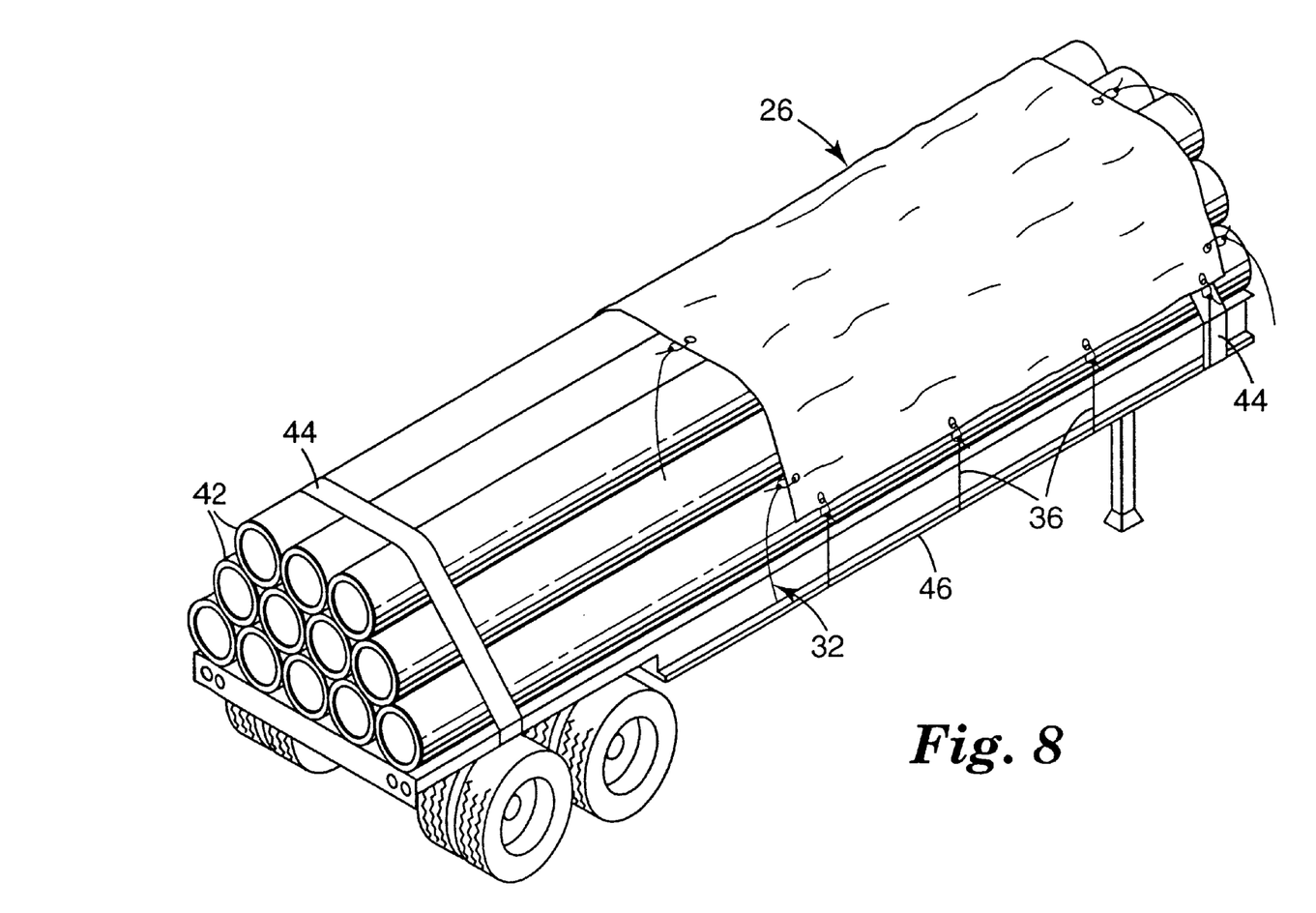
FIG. 8 is a view somewhat similar to FIG. 7 except that the forklift and the frame have been moved away from the trailer and the tarp has been tied by the cords to the bed.

Subsequently, the forklift 40 is moved to a location where the frame 12 and the tarp 26 are suspended over the cargo to be covered. An exemplary load of cargo is shown in FIGS. 6–8 and comprises a stacked load of steel pipes 42 for purposes of illustration. The pipes are secured by straps 44 to the bed of a flat bed trailer 46. Of course, other types of cargo and other types of flat bed or non-flat bed vehicles (including trucks and railway cars) may also be used in connection with the invention.

Next, the tines 38 are lowered to a position wherein the tarp 26 is closely adjacent the top of the cargo. The driver, forklift operator or other person then grasps the free terminal end section 36 of one cord 32 and pulls on its free terminal end section 36 in such a manner to slide the loop portion 34 along the respective finger 24 in a horizontal direction away from the frame 12. Once the loop portion 34 is moved a sufficient distance away from the frame 12, the loop portion 34 disengages the finger 24 and enables adjacent regions of the tarp 26 to fall toward the cargo.

Each cord 32 is manipulated in a similar manner until each of the loop portions 34 has released from its respective supporting finger 24. As a consequence, the tarp 26 has now been completely disconnected from the frame 12 and rests atop the cargo in the manner shown in FIG. 7. The free terminal end section 36 of each cord 32 can then be tied or otherwise secured to the bed of the trailer 46 to prevent shifting, flapping or other undue movement of the tarp 26 during transit.

Advantageously, the apparatus 10 of the present invention enables cargo to be covered by the tarp 26 without walking on the cargo or on the bed of the vehicle. The covering operation can be carried out on ground level by a single person if desired and by the same person using the same forklift 40 to load the cargo onto the vehicle. Moreover, the tarp 26 can be secured to the bed of the vehicle on ground level and by use of the same cords 32 that serve to suspend the tarp 26 from the frame 12.

The tarp 26 and the frame 12 may extend in horizontal dimensions that are sufficient to cover the entire load of cargo or alternatively only part of the load. If, for example, the width of the tarp 26 is sufficient to cover only about one-half of the load in directions along the length of the trailer 46, the rear portion of the load is covered initially with a first tarp so that the front portion of the load is covered with a second tarp that correctly overlaps the first tarp. In such an instance, the vehicle driver, forklift operator or other person may ignore the cords 32 (or initially remove such cords 32) that are located along the overlapping regions. Alternatively, however, a ladder may be used to access and tie together the cords along the overlapping regions if desired. Although FIGS. 6–8 illustrate the tarp 26 initially covering a front portion of the load, it is to be understood in this regard that a preferred method of covering the load includes the step of initially covering a rear portion of the load instead of the front portion so that a correct overlap of the tarps occurs, and also preferably includes the use of tarps that are sufficiently large to extend over at least a majority of the area comprising the front and rear ends of the load.

As can be appreciated, the fingers 24 serve as inexpensive couplers to releasably interconnect the frame 12 and the tarp 26. Other types of couplers may also be used. Suitable couplers include mechanisms that can be connected to the cords 32 and yet can be released from the cords 32 when desired, such as spring clips or devices resembling clothes pins. Preferably, the cords 32 are released from the frame 12 by pulling on the free terminal end sections 36, although other types of release structure can also be envisioned. For example, the couplers can comprise electrically or mechanically operated latches that can be actuated by the forklift operator to release all of the cords 32 at once. As another alternative, the couplers can be attached to the cords 32 and constructed to disconnect from the frame 12 instead of from the cords 32 when released.

Optionally, the frame 12 may be carried on the trailer 46 for easy access once the trailer 46 has reached its intended destination. The trailer 46 may be provided with a compartment that is located below the bed and has an opening along the side of the trailer 46 so that the frame 12 may be conveniently moved into or out of the compartment by the forklift 40 when desired.

As another option, a moisture resistant underlayer (not shown) may be provided beneath the tarp 26 to further protect the cargo from any adverse effects of moisture. An example of a suitable underlayer is a tarp made from a waterproof plastic sheet of material. Such underlayers are especially desirable when the tarp 26 is not completely waterproof, as is often the case with tarps made of canvas. Preferably, the underlayer includes a series of peripheral grommets similar to the grommets 30 and the grommets are connected to cords similar to the cords 32, so that the underlayer can be unfolded on the ground and draped over the cargo using the frame 12 as described above in connection with the tarp 26.

Figure 9:
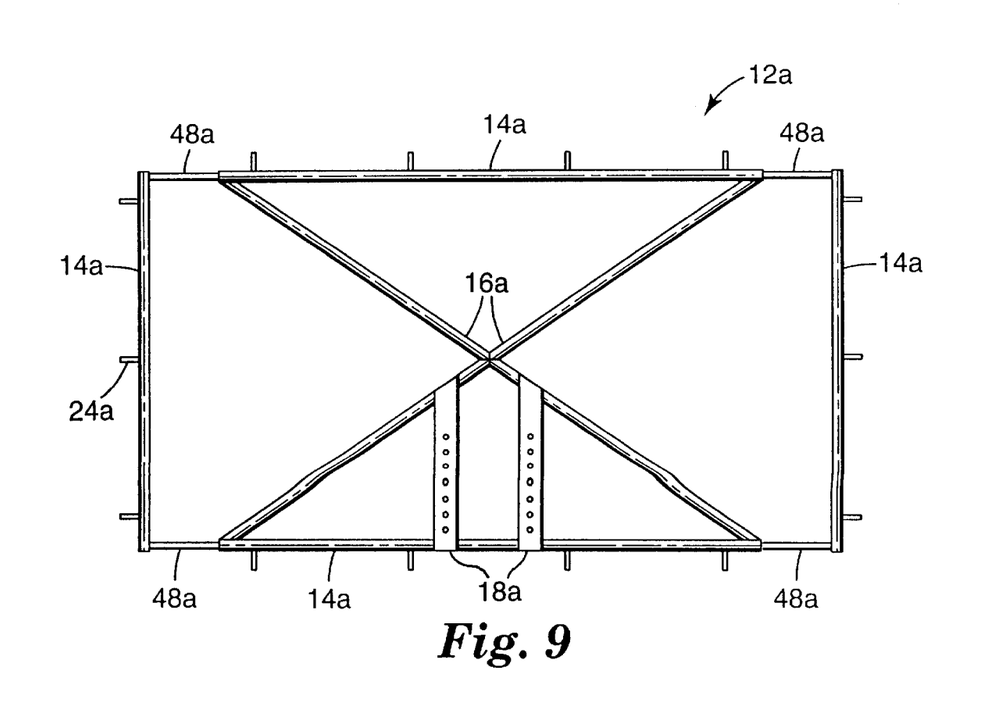
FIG. 9 is a view of a frame of an alternative embodiment of the invention, wherein the frame is extendible in horizontal dimensions to adapt to tarps or loads of different sizes.

An apparatus for covering cargo according to an alternative embodiment of the invention is partially shown in FIG. 9, and includes a frame 12a with four side members 14a and cross-bracing 16a. The frame 12a also includes a pair of receptacles 18a that are adapted to receive tines of a forklift. A number of fingers 24a are secured to the frame 12a and extend outwardly from the latter.

The frame 12a and the fingers 24a are essentially identical to the frame 12 and the fingers 24 described above with the exception that the frame 12a includes an adjustment structure that enables the horizontal dimensions of the frame 12a to be varied as desired. As a consequence, the frame 12a can be adjusted in size to match the size of different tarps and loads, so that a tarp of a particular size can be used with certain loads or vehicles as needed. Alternatively, the adjustment structure may be used in order to collapse the frame 12a when not in use to facilitate storage.

More particularly, and as depicted in FIG. 9, the adjustment structure of the frame 12a includes two rods 48a that are fixed to opposite ends of two of the four side members 14a. Each of the rods 48a is slidably received in one of the remaining two side members 14a (both of which are hollow) in telescoping relation. Although not shown in the drawings, a lock is associated with each rod 48a to releasably secure the rod 48a in a certain position relative to the receiving side members 14a. A suitable lock may comprise, for example, a pin or bolt that extends through a pair of aligned holes in the receiving side member 14a and also extends through a selected one of a series of holes that are spaced along the length of the associated rod 48a.

A number of variations and additions to the apparatus and methods set out above may become apparent to those skilled in the art without departing from the spirit of my invention. Accordingly, the invention should not be deemed limited by my presently preferred embodiments that are described in detail above, but instead only by a fair scope of the claims that follow along with their equivalents.

I claim:

1. Apparatus for covering cargo carried by a truck, trailer, railway car or other vehicle comprising:

a tarp having a peripheral edge portion;

a plurality of cords connected to said tarp at spaced-apart locations along said peripheral edge portion;

a frame extending over said tarp; and a plurality of couplers interconnecting said frame and at least one of said cords, said couplers releasably coupling said frame to said tarp, wherein said cords are of sufficient length to connect to opposite sides of the vehicle once said frame is released from said tarp.

2. Apparatus for covering cargo comprising:

a tarp having a peripheral edge portion;

a plurality of cords connected to said tarp at spaced-apart locations along said peripheral edge portion;

a frame extending over said tarp; and a plurality of couplers interconnecting said frame and at least one of said cords, said couplers releasably coupling said frame to said tarp, wherein said couplers comprise fingers that extend outwardly from said frame.

3. The apparatus of claim 2 wherein said frame and said fingers each extend in generally horizontal planes.

4. The apparatus of claim 1 wherein at least some of said cords include a free terminal end portion and a loop portion located between said tarp and said free terminal end portion.

5. Apparatus for covering cargo comprising:

a tarp having a peripheral edge portion;

a plurality of cords connected to said tarp at spaced-apart locations along said peripheral edge portion;

a frame extending over said tarp; and a plurality of couplers interconnecting said frame and at least one of said cords, said couplers releasably coupling said frame to said tarp, wherein at least one of said cords includes a free terminal end portion and a loop portion located between said tarp and said free terminal end portion, and wherein at least one of said couplers comprises a finger extending outwardly from said frame and received in said loop portion.

6. The apparatus of claim 4 wherein said loop portion and said free terminal end portion of at least one of said cords is comprised of the same material.

7. The apparatus of claim 1 wherein said frame includes a pair of spaced apart receptacles for receiving tines of a forklift.

8. Apparatus for covering cargo comprising:

a tarp having a peripheral edge portion;

a plurality of cords connected to said tarp at spaced-apart locations along said peripheral edge portion;

a frame extending over said tarp; and a plurality of couplers interconnecting said frame and at least one of said cords, said couplers releasably coupling said frame to said tarp, wherein said frame includes a pair of spaced apart receptacles for receiving tines of a forklift, and wherein said receptacles include adjustable stops for limiting the depth of insertion of the forklift tines.

9. The apparatus of claim 1 wherein said frame comprises a width and length dimension in horizontal directions, and wherein said frame is adjustable to vary at least one of said width and length dimensions.

10. The apparatus of claim 9 wherein said frame includes telescoping members that are slidable relative to each other to vary at least one of said width and length dimensions.

11. Apparatus for covering cargo comprising:

a tarp having a peripheral edge portion;

a plurality of cords connected to said tarp at spaced-apart locations along said peripheral edge portion;

a frame extending over said tarp; and a plurality of couplers interconnecting said frame and at least one of said cords, said couplers releasably coupling said frame to said tarp, wherein said frame is rigid and has an overall generally rectangular configuration and wherein said tarp has an overall generally rectangular configuration that is larger than said configuration of said frame.

12. A method of covering cargo using the apparatus of claim 1.

13. A method of covering cargo comprising the steps of:

placing a frame over a tarp;

releasably connecting a plurality of cords coupled to spaced-apart locations on the tarp to the frame;

relatively moving the frame and the cargo such that the frame and the tarp are located over the cargo; and pulling on the cords while the tarp and the frame are in position over the cargo such that the tarp is disconnected from the frame.

14. The method of claim 13 wherein said step of pulling on the cords includes the step of sliding loop portions of the cords along fingers connected to the frame.

15. The method of claim 13 wherein the cargo is elevated above ground level and said step of pulling on the cords is carried out on ground level.

16. The method of claim 13 and including the step of coupling the cords to a vehicle carrying the cargo.

17. The method of claim 16 wherein said step of coupling said cords to a vehicle is carried out subsequent to said step of pulling on the cords.

18. The method of claim 16 wherein the cargo is elevated above ground level and wherein said step of pulling on the cords and said step of coupling the cords to a vehicle are each carried out on ground level.

19. The method of claim 13 wherein the cargo is elevated above ground level and wherein said step of releasably connecting the cords coupled to spaced apart locations on the tarp to the frame is carried out at ground level.

20. The method of claim 13 wherein said step of relatively moving the frame and the cargo includes the step of lifting the frame from a location adjacent the ground and moving the frame to a position suspended over the cargo.

* * * * *